May 24, 1938.  C. H. McKINNEY  2,118,711
CARRIER
Filed April 17, 1937   5 Sheets-Sheet 3
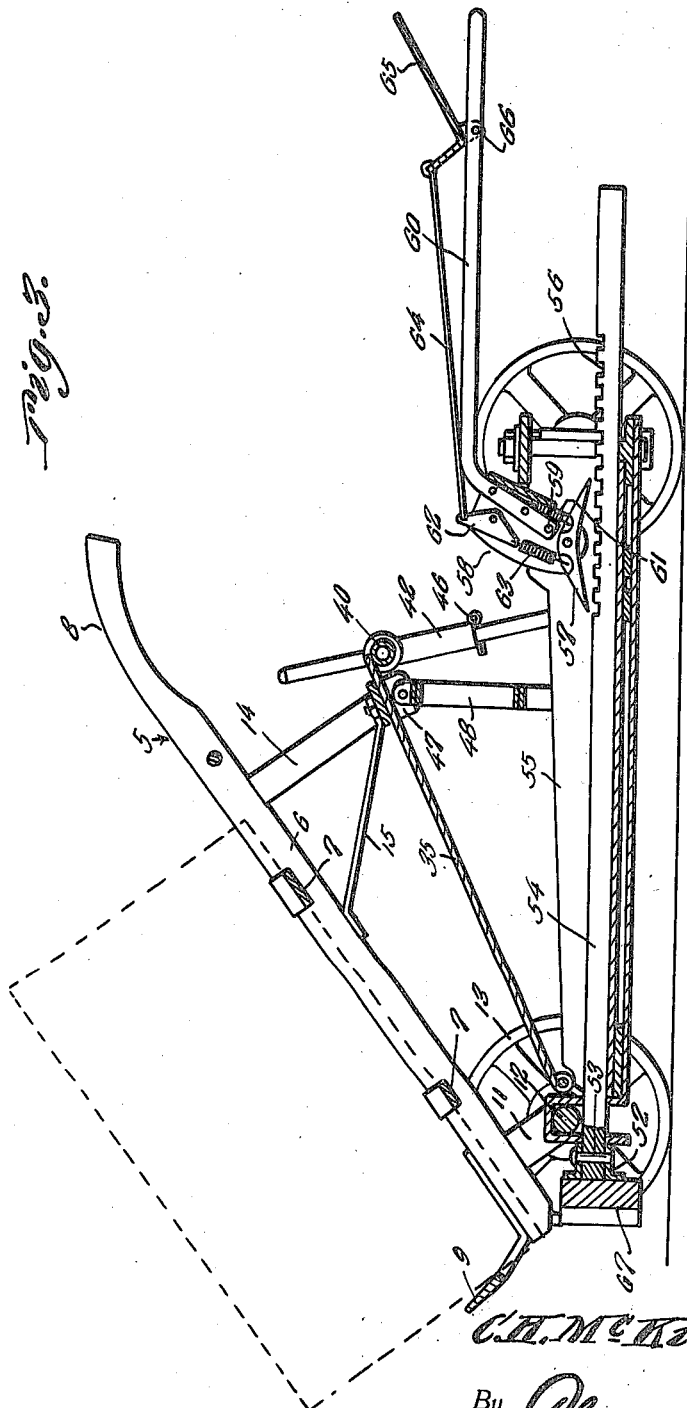
Inventor
C. H. McKinney
By Clarence A. O'Brien
Hyman Berman
Attorneys May 24, 1938.   C. H. McKINNEY   2,118,711
CARRIER
Filed April 17, 1937   5 Sheets-Sheet 4
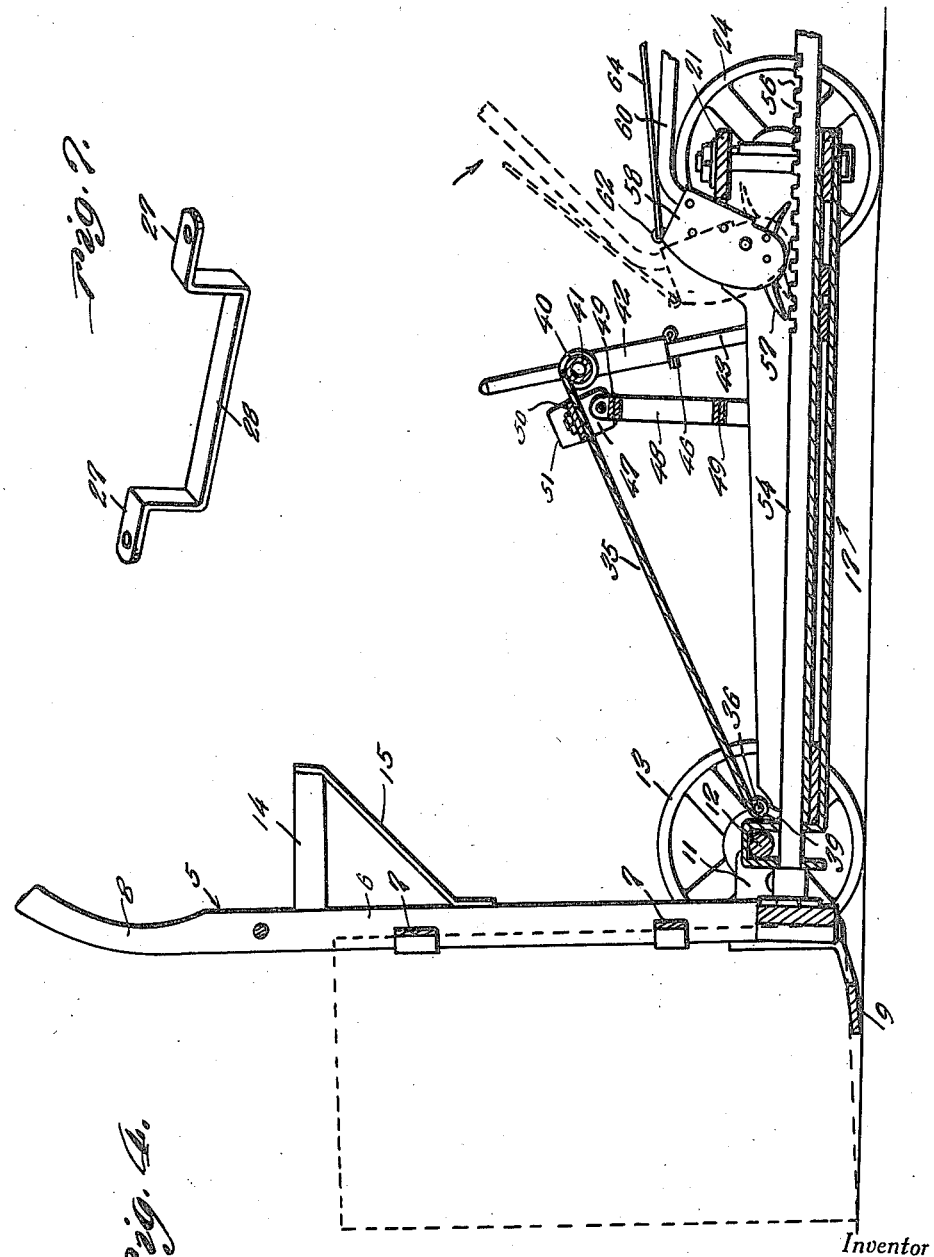
Inventor
C. H. McKinney
By Clarence A. O'Brien
Hyman Berman
Attorneys

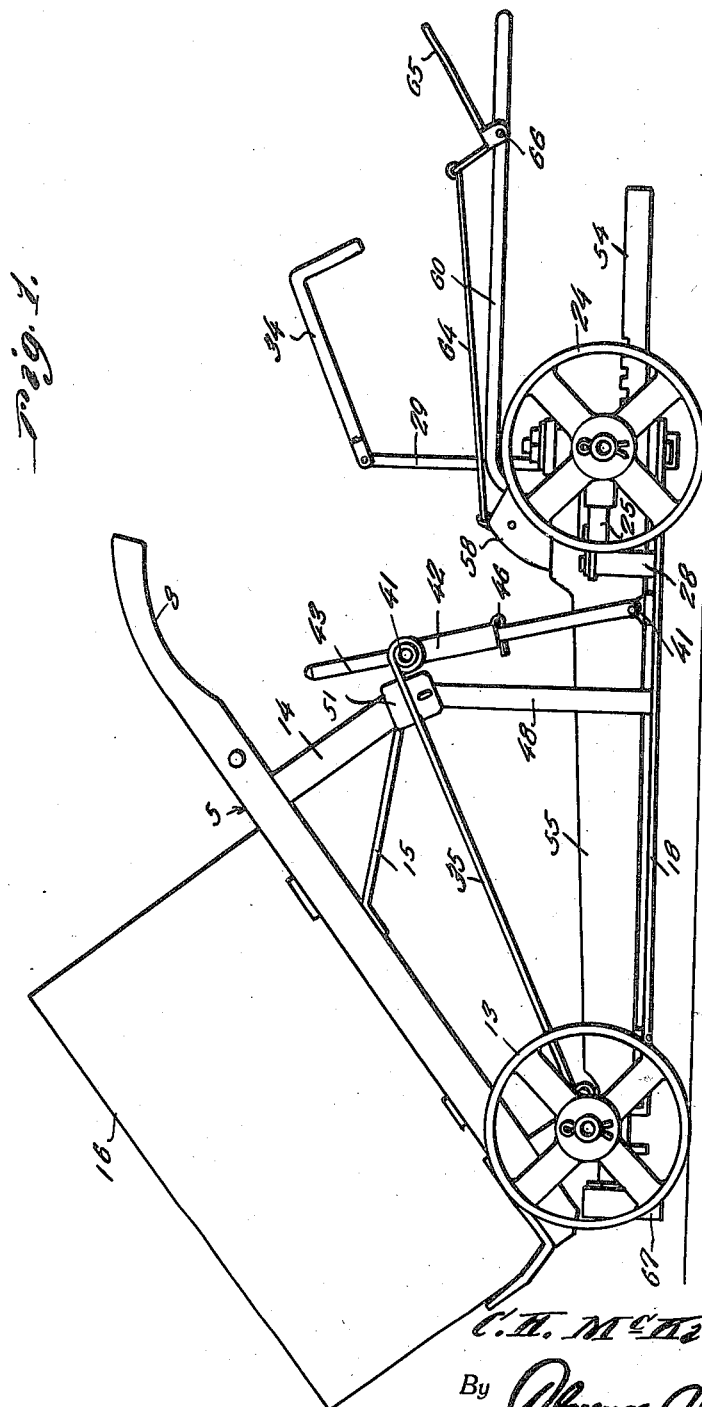

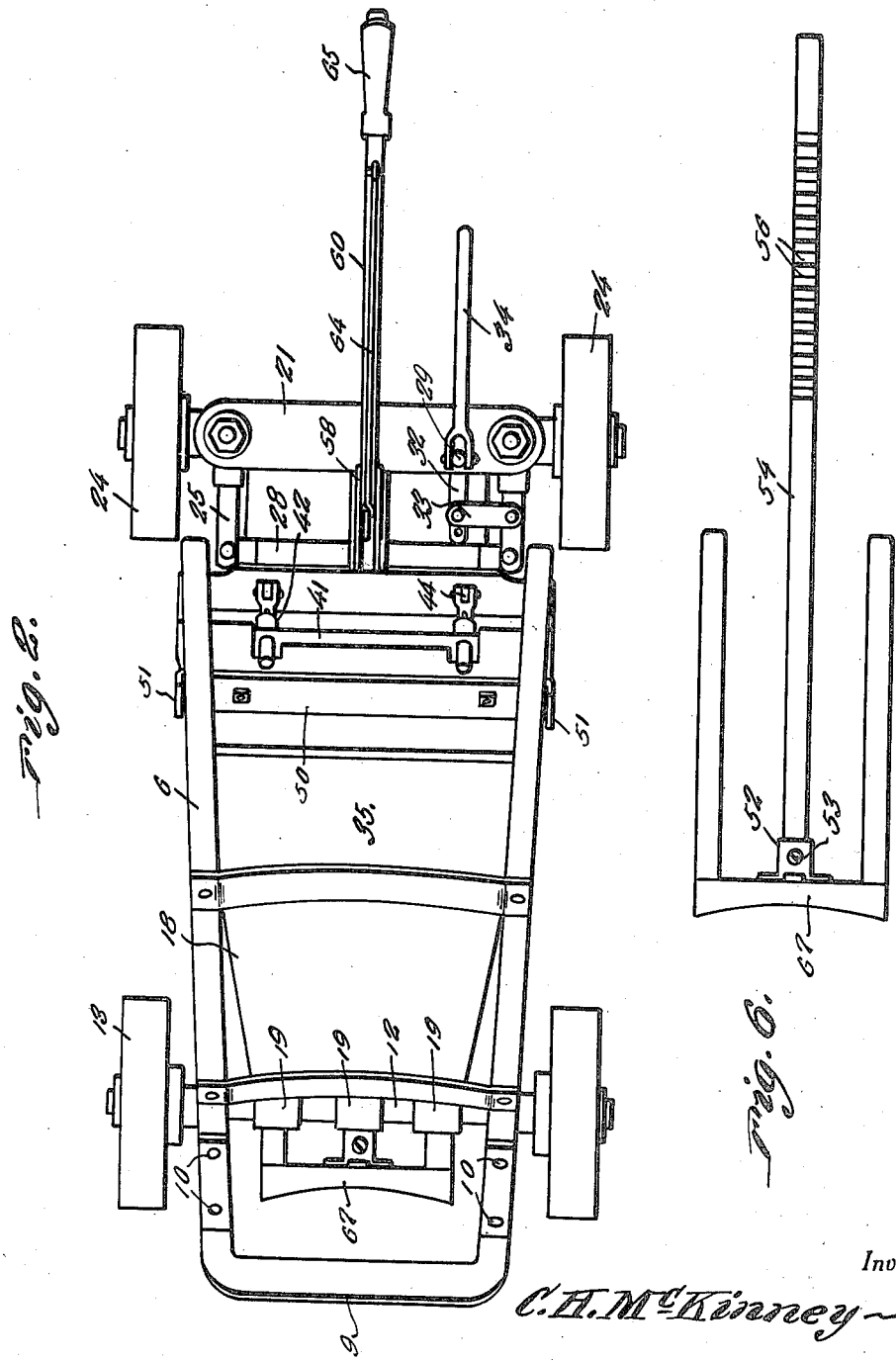

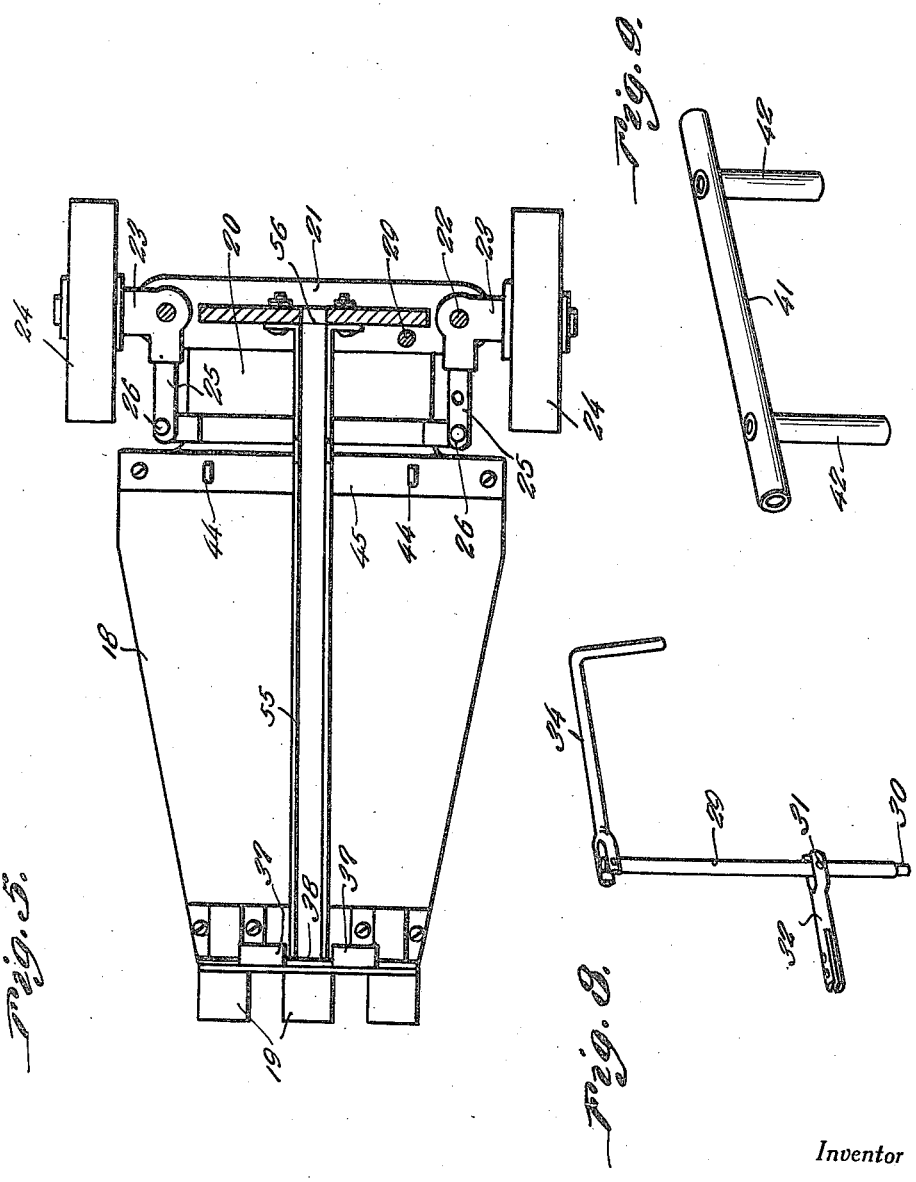

Patented May 24, 1938

2,118,711

UNITED STATES PATENT OFFICE 2,118,711

CARRIER

Charles H. McKinney, Portland, Oreg., assignor of two-thirds to Frank E. Drew, Portland, Oreg.

Application April 17, 1937, Serial No. 137,581

6 Claims. (Cl. 214—65.4)

This invention relates to carriers and particularly to carriers for large rolls of paper, particularly news print paper in rolls.

More particularly the invention resides in the provision of an attachment to a conventional hand carrier to facilitate the handling of large paper rolls, to relieve the operator of the combined weight of the carrier and roll thereon, and to otherwise render more safe and economical the handling of large rolls of paper.

The invention together with its objects and advantages will be best understood from a study of the following description taken in connection with the accompanying drawings wherein:—

Figure 1 is a side elevational view illustrating the application of the invention.

Figure 2 is a top plan view.

Figure 3 is a vertical longitudinal sectional view illustrating the application of the invention.

Figure 4 is a view somewhat similar to Figure 3 but showing the parts in position incidental to the placing of a roll on the carrier or the unloading of the carrier.

Figure 5 is a top plan view of the attachment per se with certain parts omitted and other parts shown in section.

Figure 6 is a top plan view of the ejector or follower.

Figure 7 is a perspective view of a tie bar forming part of the invention.

Figure 8 is a perspective view of the steering assembly.

Figure 9 is a perspective view of a cross member hereinafter more fully referred to.

Referring to the drawings by reference numerals it will be seen that 5 indicates generally a somewhat conventional carrier or hand truck.

The truck as shown embodies a frame consisting of side members 6 braced by cross bars 7, the side members 6 having handles 8 at their upper ends.

At the front the truck frame is equipped with an apron 9 of approximately U-shape, constructed of suitable metal, and having the sides thereof at the open end of the U riveted or otherwise secured as at 10 to the forward ends of the sides 6 of the truck frame.

At said forward or front end the truck is also provided with bearings 11 that support an axle 12 on the ends of which are wheels 13.

Adjacent the rear ends of the side bars 6 there are provided supporting standards 14 braced relative to the truck frame through the medium of braces 15.

From the above, it will be seen that the truck 5 closely approximates the structure of trucks now generally employed for handling large rolls 16 of paper, such as news print paper in rolls.

The attachment per se is indicated generally by the reference numeral 17 and comprises a body plate 18 of suitable edge contour. At its forward end the plate 18 has formed integrally therewith in any suitable manner a series, in the present instance, three hooks 19 that hook over the axle 12 in a manner as clearly shown in Figures 2 and 4.

At its rear end the plate 18 is laterally reduced to provide an extension 20 that is bolted or otherwise secured to the bottom flange of an axle member 21 that is in the form of an I-beam.

The body portion of the I-beam 21 at the respective opposite ends of the beam have parts thereof removed to accommodate what may be termed spindle bolts 22 that accommodate axles 23 on which are mounted wheels 24 for supporting the rear end of the body plate 18.

The axles 23 have steering arms 25 extending therefrom and these arms 25 at their free ends are pivoted as at 26 to the flanges 27 of a substantially U-shaped tie rod 28.

For turning the wheels 24 either to the right or left for changing the direction of travel of the truck 5 with the attachment 17 associated therewith, there is provided a vertical steering post 29 that has its lower portion extending through an opening in the top of the I-beam 21, a pin 30 being provided on the lower end of the rod to fit in a socket or opening provided therefor in the bottom flange of the I-beam 21.

Adjacent said lower end the steering post 29 has pivoted thereto as at 31 an arm 32 which has an adjustable pivotal connection with a link 33 that at one end is pivoted to one of the arms 25 as shown in Figure 2.

Pivoted to the upper end of the post 29 is a handle 34. It will thus be seen that by turning the post 29 to the right or left this turning movement of the post will be transmitted to the wheels 24 for changing the direction of travel of the truck.

A supporting member in the form of a plate 35 is provided and said member at its forward end is provided with hinge sleeves 36 that align with hinge sleeves 37 provided on a plate 38 welded or otherwise secured to the rear sides of the hooks 12. Engaged in the aligned sleeves 36 and 27 is a hinge pin 39. Thus it will be seen that the plate 35 is supported on the attachment for vertical swinging movement.

At its rear or free end the plate 35 is rolled to provide a hinge sleeve 40 which receives a tubular cross member 41.

The cross member 41 adjacent its respective opposite ends is provided with tubular extensions 42 that have a sliding fit on supporting rods 43 as clearly shown in Figure 4.

The supporting rods 43 at one end are pivoted to lugs 44 provided on a reinforcement plate 45 riveted or otherwise secured to the plate 18 adjacent the rear end of the latter and extending transversely of the body plate 18.

The sleeves or tubes 42 are secured at the desired adjustment on the rods 43 through the medium of cotter pins or the like 46 engaged in selected openings provided in the rods 43. Thus it will be appreciated that the rods 43 serve to support the member 35 at the desired inclination.

Adjacent its rear or free end the supporting member 35 is provided with lugs 47 to which are pivoted legs 48.

The legs 48 are adapted to have their lower ends rest on the body plate 18 when the supporting member 35 is at the desired angle of inclination, and these legs 48 are connected together and braced relative to one another through the medium of suitable braces 49.

At the leg equipped end thereof the supporting member 35 has secured thereto a transverse bar 50 which at its respective opposite ends is provided with upstanding flanges 51. The flanges 51 act as guides for the truck supporting legs 14 as the truck 5 is being swung from the position shown in Fig. 4, for example to the position shown in Fig. 1 to rest the legs 14 of the truck on the transverse bar 50. These flanges 51 thus engaging the legs 14 at the outer sides thereof with the truck 5 positioned as shown in Fig. 1 will serve to hold the truck 5 against casual lateral movement.

To facilitate unloading the truck, that is for moving the roll 16 from the truck when the latter is in the position shown, for example in Figure 4, there is provided a ram 67 having a concave working face to conformably engage the roll. Ram 67 on its rear side is suitably provided with a socket 52 through the medium of which and a bolt or similar fastening element 53, said ram is secured on one end of a rod 54.

The rod 54 works in a channel guide member 55 mounted on and extending longitudinally of the body plate 18 in line with openings provided in the vertical portions of the intermediate hook 19 and an opening 56 provided in the web of the I-beam 21 as will be clear from a study of Figures 3 and 5.

For projecting and retracting the ram 67 there is provided on the rod 54 adjacent its free end a series of ratchet teeth 56.

Cooperable with the ratchet teeth 56 is a dog 57 which is pivoted intermediate its ends between the sides of a substantially U-shaped member 58 that in turn is pivoted as at 59 between the sides of the channel guide member 55.

A handle 60 has one end riveted or otherwise secured between the sides of the member 58 and at said end the handle 60 is connected with the dog 57 through the medium of a coil spring 61.

A substantially triangular plate or lever 62 is pivoted between the sides of the member 58 and at one corner is connected with the dog 57 through the medium of a spring 63. At its relatively opposite corner the plate lever 62 is connected with one end of a link 64, the opposite end of which link is pivoted to the angular end of a hand lever 65 that is pivoted to the handle 60 as at 66.

With the truck 5 in the position shown in Figure 4, it will be seen that the roll 16 may be readily forced off of the nose piece or apron 9 through the medium of the ram 67 in the following manner. By working the handle 60 up and down the forward end of the dog 57 successively engages the ratchet teeth 56 for projecting the rod 54 and ram 67, and the latter engaging behind the roll 16 will ultimately force the roll off of the apron or nose piece 5.

After the roll 16 has been forced off the apron the operator applies pressure to the handle member 65 to swing the latter into substantial parallelism with the handle 60. This will result in the dog 57 being rocked so that the lower end thereof is brought into position to cooperate with the ratchet teeth 56. With the dog in this position handle 60 is worked up and down so that the rear end of the dog 57 will successively engage the teeth 56 for retracting the rod 54 and the ram 67 returning the latter to the normal position thereof as shown in Figure 3.

From the above, it will also be apparent that when it is desired to load the truck the parts are positioned as shown, for example in Figure 4. With the parts in this position the device is moved forwardly so that the nose piece or apron 9 will slide under the bottom end of the roll 16 after which the truck is tilted back to the position shown for example in Figure 3 to be supported in this tilted position by the supporting plate 35 of the attachment 17.

The parts are now in position to permit the truck to be readily moved from place to place, the steering of the truck being controlled by the operator at the back of the attachment and by swinging the handle 34 either to the right or left for changing the path of travel of the truck either to the right or left as found desirable.

When it is not desired to use the attachment the same may be readily unhooked from the axle 12 and the support member 35 folded down relatively to the body plate 18, the legs 48 folding relative to the supporting member 35 and the pins 46 being removed to permit the supporting props 43 to fold relative to the body plate 18 and the supporting member 35.

It is thought that a clear understanding of the construction, utility and advantages of an invention of this character will be had without a more detailed description.

While I have illustrated certain details of construction it is to be understood that it is in nowise intended to unduly restrict the invention to the specific details herein illustrated and described and that certain changes, in actual practice may be resorted to, as for example if and when desired on the underside of the plate 18 adjacent the forward end thereof a small wheel to facilitate moving the attachment from place to place when the latter has been detached from the truck 5.

Having thus described the invention, what is claimed is:

1. An attachment for hand trucks comprising a body plate provided at one end with hooks to engage over the axle of a hand truck, steering wheels secured to the rear of said body plate for supporting the latter, a supporting member pivotally secured at one end to the forward end of the body plate, and supporting legs for the supporting member pivoted to the latter adjacent the rear end thereof, said supporting legs being arranged to rest on the body plate.

2. An attachment for hand trucks comprising a body plate, hooks on one end edge of said plate to engage the axle of a hand truck, steering wheels secured to the rear of said body plate for supporting the latter, a supporting member pivotally secured at one end to the forward end of the body plate, and supporting legs for the supporting member pivoted to the latter adjacent the rear end thereof, said supporting legs being arranged to rest on the body plate, and steering mechanism connected with said steering wheels for swinging the latter either to the right or left for changing the direction of travel of the truck.

3. An attachment for hand trucks comprising a body plate arranged to be pivotally secured to a truck adjacent the axle thereof, supporting wheels for the body plate secured thereto at the rear end of the body plate, a supporting plate pivoted to the body plate adjacent the forward end of the latter, prop members pivoted to the body plate adjacent the rear end of the latter, a cross rod extending between said supporting props and provided with sleeves having a sliding fit on said supporting props and said supporting plate having a tubular formation at the rear end thereof through which said cross member extends, and means on said supporting props and engageable with said sleeves for securing the latter at the desired adjustment longitudinally on the supporting props.

4. An attachment for hand trucks comprising a body member arranged to be pivotally secured to a truck adjacent the axle thereof, supporting legs for the body members secured to the latter at the rear end of said body member, supporting means on said body plate for supporting the frame of the hand truck at the desired angle of inclination, a guide member on the body plate and extending longitudinally thereof, a rod having a sliding fit in said guide member, and a ram on one end of the rod for engaging said article on said truck to force the article from the truck when the latter is in a substantially perpendicular position, and mechanism associated with said rod for projecting and retracting said ram relative to the body plate.

5. An attachment for hand trucks comprising a body member arranged to be pivotally secured to a truck adjacent the axle thereof, supporting legs for the body members secured to the latter at the rear end of said body member, supporting means on said body plate for supporting the frame of the hand truck at the desired angle of inclination, a guide member on the body plate and extending longitudinally thereof, a rod having a sliding fit in said guide member, and a ram on one end of the rod for engaging said article on said truck to force the article from the truck when the latter is in a substantially perpendicular position, and mechanism associated with said rod for projecting and retracting said ram relative to the body plate, said mechanism including ratchet teeth on said rod, a member pivoted between the sides of said guide member, a double pointed dog pivoted intermediate its end to said pivoted member and having its ends arranged for selective engagement with said ratchet teeth, a handle member secured at one end to said pivoted member, a spring connecting said end of the handle member to one end of said dog, a lever pivoted to said handle, a plate-like lever pivoted on said pivoted member, a spring connecting said plate lever to one end of said dog, and a link operatively connecting said plate member with said handle lever.

6. An attachment for hand trucks for supporting the latter at the desired angle of inclination, said attachment comprising a body plate having a transverse series of hooks at one end thereof to engage over the axle of a hand truck, steering wheels supporting said body plate at the rear of the latter, steering mechanism connected with said steering wheels, a truck-supporting element pivoted at one end thereof to said body plate adjacent the first mentioned end of the latter, means carried by said truck body supporting element for securing the latter at the desired angle of inclination on the attachment, a ram at the hook-equipped end of said body plate and provided with a rod extending longitudinally of the body plate, guide means for said rod secured to the underside of said body plate, an operating lever pivotally mounted on said body plate, and co-operating means on said operating lever and the rod of the ram for shifting the latter longitudinally of the body plate to project or retract the ram, optionally.

CHARLES H. McKINNEY.